United States Patent
Morgantini et al.

(10) Patent No.: US 12,543,097 B2
(45) Date of Patent: Feb. 3, 2026

(54) CONTROL OF COMMUNICATION HANDOVERS BASED ON CRITICALITY OF RUNNING SOFTWARE PROGRAMS

(71) Applicant: International Business Machines Corporation, Armonk, NY (US)

(72) Inventors: Daniele Morgantini, Rome (IT); Chiara Conti, Rome (IT); Michela Melfa, Rome (IT); Maria Elena Taglieri, Bracciano (IT)

(73) Assignee: International Business Machines Corporation, Armonk, NY (US)

( * ) Notice: Subject to any disclaimer, the term of this patent is extended or adjusted under 35 U.S.C. 154(b) by 570 days.

(21) Appl. No.: 17/652,340

(22) Filed: Feb. 24, 2022

(65) Prior Publication Data

US 2023/0269652 A1 Aug. 24, 2023

(51) Int. Cl.
*H04W 36/36* (2009.01)
*H04W 36/08* (2009.01)
*H04W 36/00* (2009.01)

(52) U.S. Cl.
CPC ........... *H04W 36/36* (2013.01); *H04W 36/08* (2013.01); *H04W 36/008375* (2023.05)

(58) Field of Classification Search
CPC ........... H04W 36/36; H04W 36/00837; H04W 36/08; H04W 36/008375; H04W 84/12; H04W 36/14
See application file for complete search history.

(56) References Cited

U.S. PATENT DOCUMENTS 7,693,093 B2  4/2010  Riedel
8,750,265 B2  6/2014  Scherzer
(Continued)

FOREIGN PATENT DOCUMENTS

CN   100583796 C   1/2010
CN   103327556 B   5/2016
CN   102907121 B   6/2016

OTHER PUBLICATIONS

Disclosed Anonymously, "Method and system for contextual switching of wireless network dynamically", An IP.com Prior Art Database Technical Disclosure, IP.com No. IPCOM000262498D, IP.com Electronic Publication Date: Jun. 7, 2020, 5 pages, <https://priorart.ip.com/IPCOM/000262498>.

(Continued)

*Primary Examiner* — Christine Ng
(74) *Attorney, Agent, or Firm* — Scott Dobson

(57) ABSTRACT

Controlling communication handovers of a client computing device among a plurality of wireless networks providing access to a service network includes monitoring, by the client computing device, corresponding program usage information relating to the access to the service network of one or more software programs installed on the client computing device. The client computing device determines criticality indicators of the one or more software programs according to the corresponding program usage information and detects one or more wireless networks available for a current handover from a current wireless network to which the client computing device is currently connected. The client computing device controls the current handover from the current wireless network to a selected wireless network from the plurality of available wireless networks according to the criticality indicators of the one or more software programs currently running on the client computing device.

18 Claims, 10 Drawing Sheets

(56) References Cited

U.S. PATENT DOCUMENTS

| | | | |
|---|---|---|---|
| 9,084,081 B2 | 7/2015 | Gupta | |
| 2006/0099952 A1* | 5/2006 | Prehofer | H04W 36/24 |
| | | | 455/436 |
| 2008/0238794 A1* | 10/2008 | Pan | H01Q 9/145 |
| | | | 343/767 |
| 2012/0072913 A1* | 3/2012 | Uola | G06F 9/5033 |
| | | | 718/100 |
| 2013/0272269 A1 | 10/2013 | Srivastava | |
| 2015/0017985 A1* | 1/2015 | Safavi | H04W 36/302 |
| | | | 455/436 |
| 2015/0181607 A1* | 6/2015 | Csaszar | H04W 28/20 |
| | | | 455/405 |
| 2017/0006087 A1* | 1/2017 | Smith | H04W 36/322 |
| 2018/0262991 A1* | 9/2018 | Rao | H04W 52/0261 |
| 2018/0276552 A1* | 9/2018 | Liu | G06Q 10/06315 |
| 2021/0045030 A1* | 2/2021 | Kim | H04W 52/028 |
| 2022/0038464 A1* | 2/2022 | Corrigan | G06F 11/3438 |

OTHER PUBLICATIONS

Maaloul, et al., "Context Awareness and Class of Service Satisfaction for Modeling Handover Decision-Making", International Journal of Computer Applications, vol. 47, No. 20, Jun. 2012, 10 pages, <https://citeseerx.ist.psu.edu/viewdoc/download?doi=10.1.1.258.7741&rep=rep1&type=pdf>.

Mell, et al., "The NIST Definition of Cloud Computing", National Institute of Standards and Technology, Special Publication 800-145, Sep. 2011, 7 pages.

Pahal, et al., "Cross Layer Based Dynamic Handover Decision in Heterogeneous Wireless Networks", Wireless Personal Communications, 82, Jun. 2015, pp. 1665-1684, <https://www.researchgate.net/publication/276313478>.

* cited by examiner

CONTROL OF COMMUNICATION HANDOVERS BASED ON CRITICALITY OF RUNNING SOFTWARE PROGRAMS

BACKGROUND

The present invention generally relates to the field of information technology, and more particularly to controlling communication handovers.

Access to (service) networks by different types of clients is commonplace for exploiting offered services. A typical example is the Internet, which use is part of everyday life for most persons. The access to the Internet is increasingly being implemented using wireless techniques. This is mainly due to the widespread diffusion of clients of mobile type, or mobile stations (MB), which provides portable access to the Internet (for example, smartphones and Internet of Things (IoT) devices). The need for relying on services leveraging the Internet by mobile stations requires the capability of accessing the Internet from almost everywhere. This is especially true for IoT devices, which are substantially ubiquitous.

In this case, the clients access the Internet by connecting to wireless networks via corresponding networking devices. For example, the wireless networks may be implemented by Access Points (APs), typically based on the Wireless Fidelity (Wi-Fi) technology, which access points relay information between the Wi-Fi (wireless) networks and a landline telephone network. Particularly, unprotected access points allowing free connection to their Wi-Fi networks are available in many locations, such as companies, stations, trains and so on. Moreover, the wireless networks may be implemented by base stations of mobile telephone infrastructures, for example, of 3G/4G type, which base stations relay information between the mobile (wireless) networks and corresponding core networks. The base stations define cells of their mobile networks, which provide a very large territorial coverage.

The (available) wireless networks that are available to each client generally change over time, together with their connection quality. This is especially true for the mobile stations, because of their nomadic nature. However, this may also happen when the client is stationary. For example, the connection quality of the available wireless networks may change (increase/decrease) according to the number of clients that are connected thereto. Moreover, networking devices implementing adaptive beamforming techniques may alter a pattern of corresponding transmitted signals dynamically (by suitably controlling an array of antennas to generate a constructive or destructive interaction along different directions), so as to attenuate/intensify the transmitted signals according to possible (co-channel/overlapping) interferences.

As a result, the connection quality of a (current) wireless network to which the client is currently connected may become too poor, while at the same time other available wireless networks may provide a better connection quality. In this situation, it is possible to perform a hand-over (or hand-off), where the client selects an available wireless network providing the best connection quality and then transfers its connection from the current wireless network to the selected (available) wireless network. This operation is generally performed automatically to (known) wireless networks that have already been used previously by the client.

However, in some cases the handover may be counterproductive. A typical example is that of a smartphone of a user waiting for a train on a platform while making a business videoconference. For this purpose, the smartphone is connected to a mobile network of a mobile telephone operator of the user. Meanwhile, a train belonging to a company that has been used in the past by the user (connecting to its Wi-Fi network) passes or stops nearby. In this situation, the smartphone may perform a handover from the mobile network to the Wi-Fi network. The Wi-Fi network is generally open, but it implements a captive portal that is displayed before granting the access to the Internet (for example, to perform an authentication of the user via his/her ticket). Therefore, the access to the Internet is lost until the user enters the information required by the captive portal (or the user reverts to the mobile network manually). In this case, the handover is substantially useless (since the connection to the Wi-Fi network will be dropped shortly as soon as the train leaves the location of the user), but worse the business videoconference is interrupted while the access to the Internet is lost. Another typical example is that of a high number of IoT devices that are within a same area where multiple wireless networks are available. In this case, all the IoT devices connect to the wireless network with the highest connection quality. However, this wireless network may become overloaded, at the same time with the other wireless networks that may be under exploited.

All of the above may result in user's frustration, missed client interactions and customer dissatisfaction.

SUMMARY

A simplified summary of the present disclosure is herein presented in order to provide a basic understanding thereof. However, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of controlling the handovers according to an actual usage of the client.

Particularly, an aspect provides a method for controlling handovers of a client computing device. Criticality indicators of one or more software programs (installed on the client computing device) are determined according to corresponding program usage information. Each handover is controlled according to the criticality indicators of the software programs currently running on the client computing device.

A further aspect provides a software program for implementing the method.

A further aspect provides a corresponding software program product.

A further aspect provides a client computing device for implementing this method.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes, like value, content and representation). Particularly.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

With reference in particular to FIGS. 1A-1F, general principles for controlling handovers based on a criticality of running software programs are shown, according to an embodiment of the present disclosure.

Figure 1A:
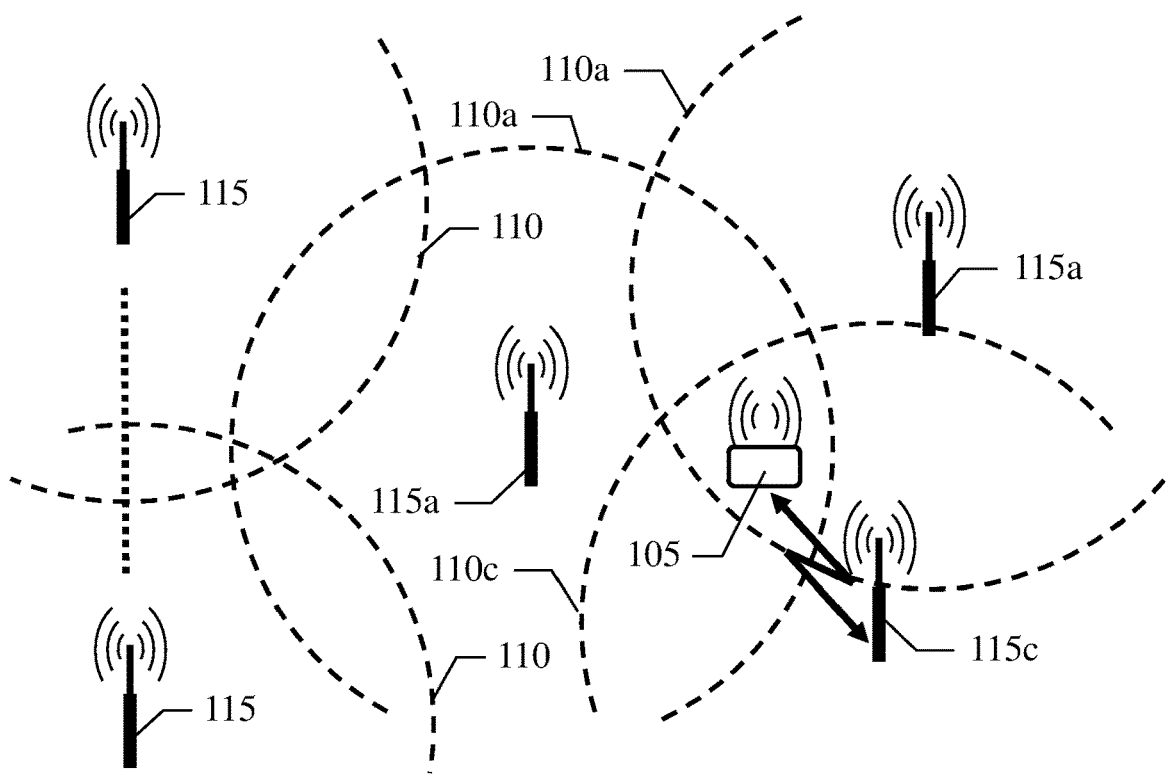
FIG. 1A is a diagram illustrating a client computing device used to access a service network, according to an embodiment of the present disclosure.

Referring now to FIG. 1A, a computing device is used to access a service network, such as the Internet. Particularly, the computing device is a client computing device, or simply client 105 (for example, a smartphone or an IoT device). The client 105 is used to exploit services offered by one or more server computing systems, or simply servers of the Internet (not shown in the figure). For example, a user of a smartphone may perform videoconferences, work remotely and so on, or a IoT device may collect physiologic parameters of a patient for use by a doctor, may control an appliance remotely and so on.

The client 105 accesses the Internet via connection to wireless networks 110 implemented by networking devices 115 (i.e., without physical cables but exploiting waves), for example, access points (implementing Wi-Fi networks) or base stations (implementing mobile networks). In the condition shown in the figure, the client 105 is connected to a (current) wireless network implemented by a corresponding networking device, differentiated with the references 110c and 115c, respectively. At the same time, one or more additional (available) wireless networks implemented by corresponding networking devices, differentiated with the references 110a and 115a, respectively, are available for connection thereto by the client 105. For example, the available wireless networks 110a are (known) wireless networks that have already been used by the client 105 in the past (i.e., with the client 105 storing their identifiers and possible passwords). In this condition, if necessary, the client 105 may perform a handover from the current wireless network 110c to one of the available wireless networks 110a.

Figure 1B:
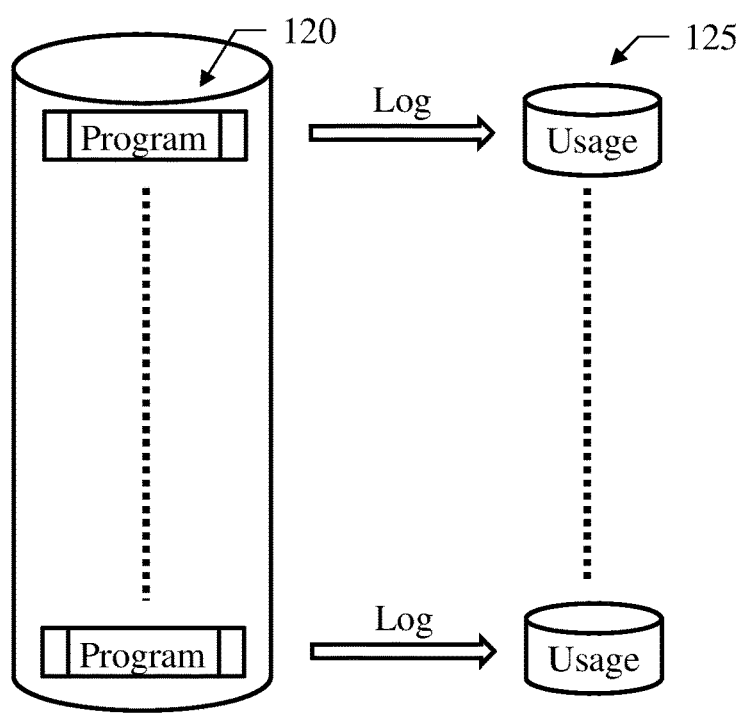
FIG. 1B is a diagram illustrating one or more software programs installed in the client computing device, according to an embodiment of the present disclosure.

Referring now to FIG. 1B, the client 105 has one or more software programs 120 that are installed thereon (for example, applications, services and so on). In the solution according to an embodiment of the present disclosure, program usage information 125 relating to the access of the client 105 to the Internet is monitored (and logged) for the programs 120 (e.g., their usage periods/locations, network workloads, handover results and so on).

Figure 1C:
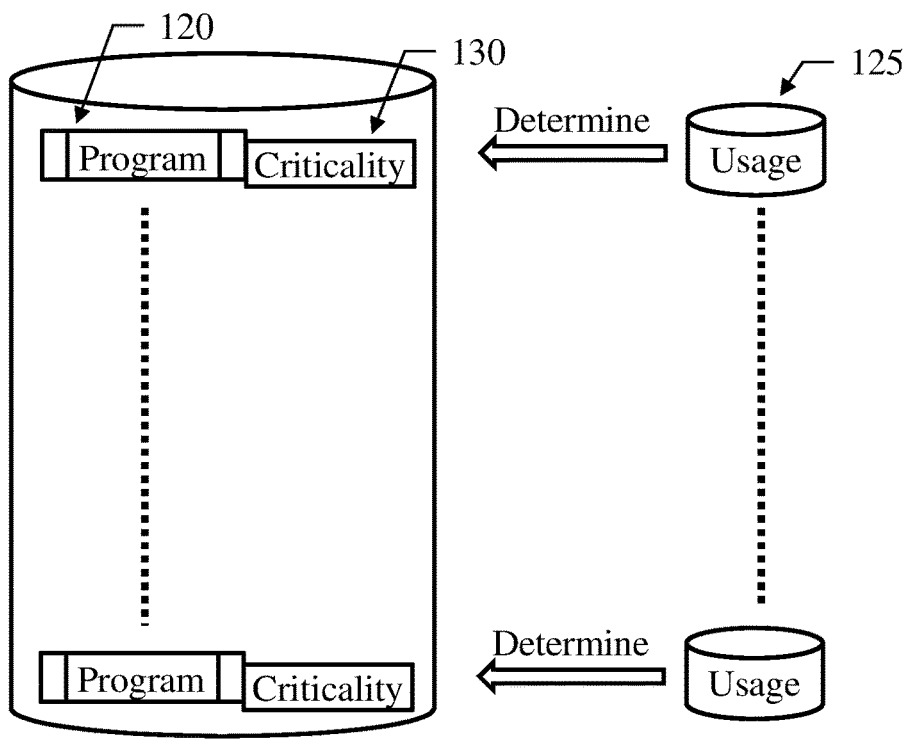
FIG. 1C is a diagram illustrating critically indicators corresponding to the one or more software programs, according to an embodiment of the present disclosure.

Referring now to FIG. 1C, corresponding criticality indicators 130 are determined for each of the programs 120 according to their program usage information 125. Each criticality indicator 130 measures how much critical is the corresponding program 120. Particularly, the criticality indicator 130 of a program 120 is based on an importance of its execution and on its dependence on the access to the Internet. Therefore, a program 120 requiring a stable and/or reliable network connection and which execution is crucial is assigned a high criticality indicator, since any interruption of the access to the Internet while it is running may be detrimental (such as in case of business teleconference or autonomous driving). Conversely, a program that is less dependent on the stability/reliability of the network connection and/or whose execution is secondary is assigned a low criticality indicator, since a possible interruption of the access to the Internet while it is running generally does not cause any problem (such as in case of game playing or appliance control).

Figure 1D:
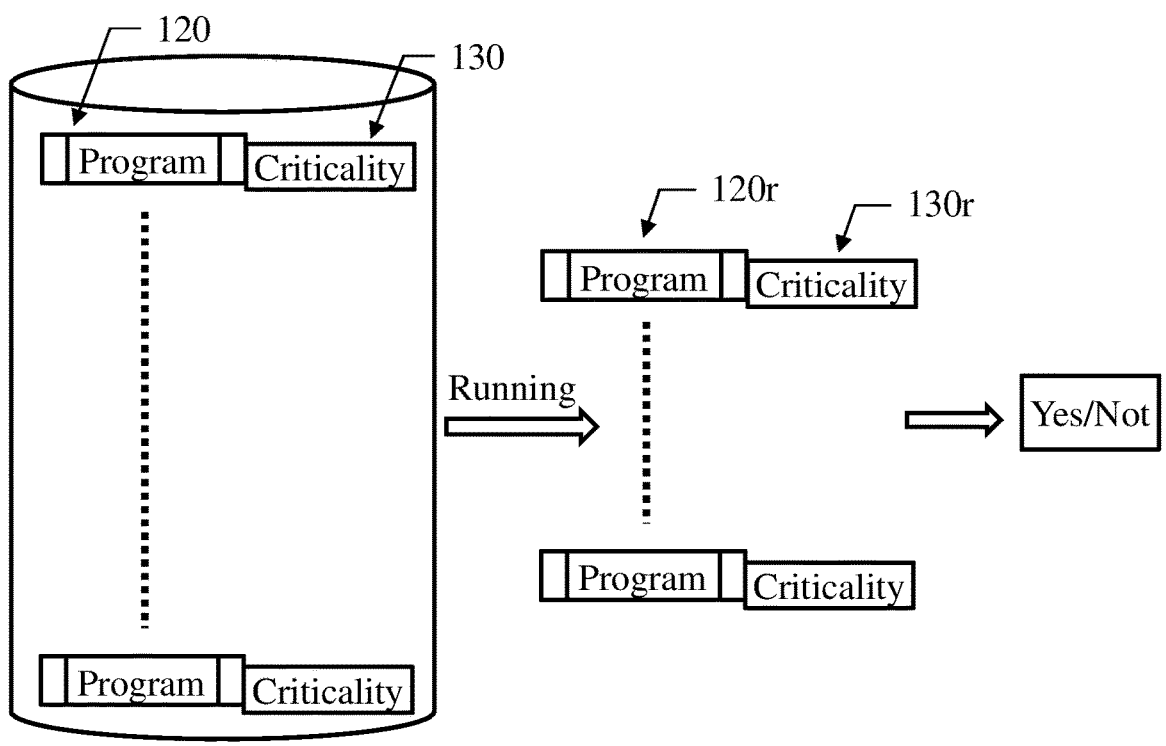
FIG. 1D is a diagram illustrating handover from a current wireless network to a selected available wireless network, according to an embodiment of the present disclosure.

Referring now to FIG. 1D, each (current) handover from the current wireless network to a selected wireless network among the available wireless networks (not shown in the figure) is controlled according to the criticality indicators 130 of the programs 120 that are currently running on the client 105, differentiated with the references 130r and 120r, respectively. Particularly, a (handover) enablement of the handover (i.e., allowed or refused) is determined according to the criticality indicators 130*r* of the running programs 120*r* (with the selected wireless network that may also be determined according thereto).

Figure 1E:
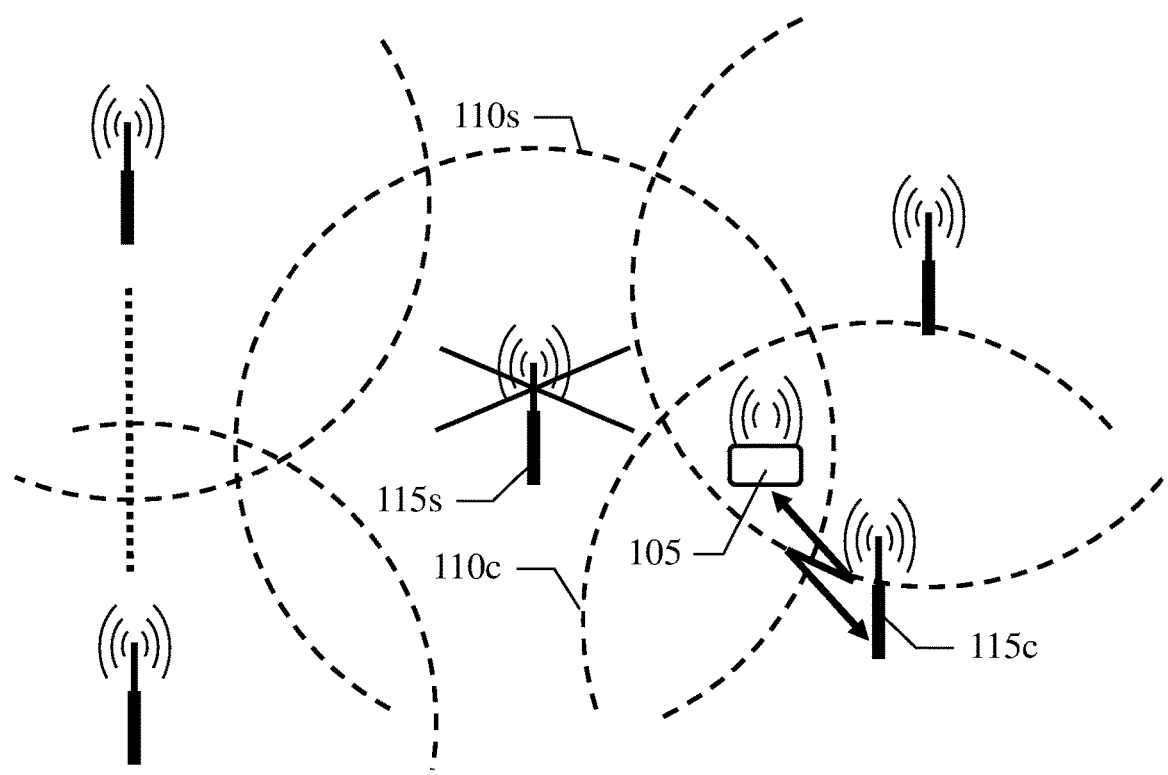
FIG. 1E is a diagram illustrating an exemplary situation in which a handover is refused by the client computing device, according to an embodiment of the present disclosure.

For example, FIG. 1E shows a situation wherein a videoconference program is running while the client 105 is at the workplace of its user during his/her working time and previous handovers to the selected wireless network implemented by a corresponding networking device, differentiated with the references 110*s* and 115*s*, respectively, were reversed while the videoconference program was running. In this case, the handover is refused. Therefore, the client 105 remains connected to the current wireless network 110*c* implemented by the networking device 115*c*.

Figure 1F:
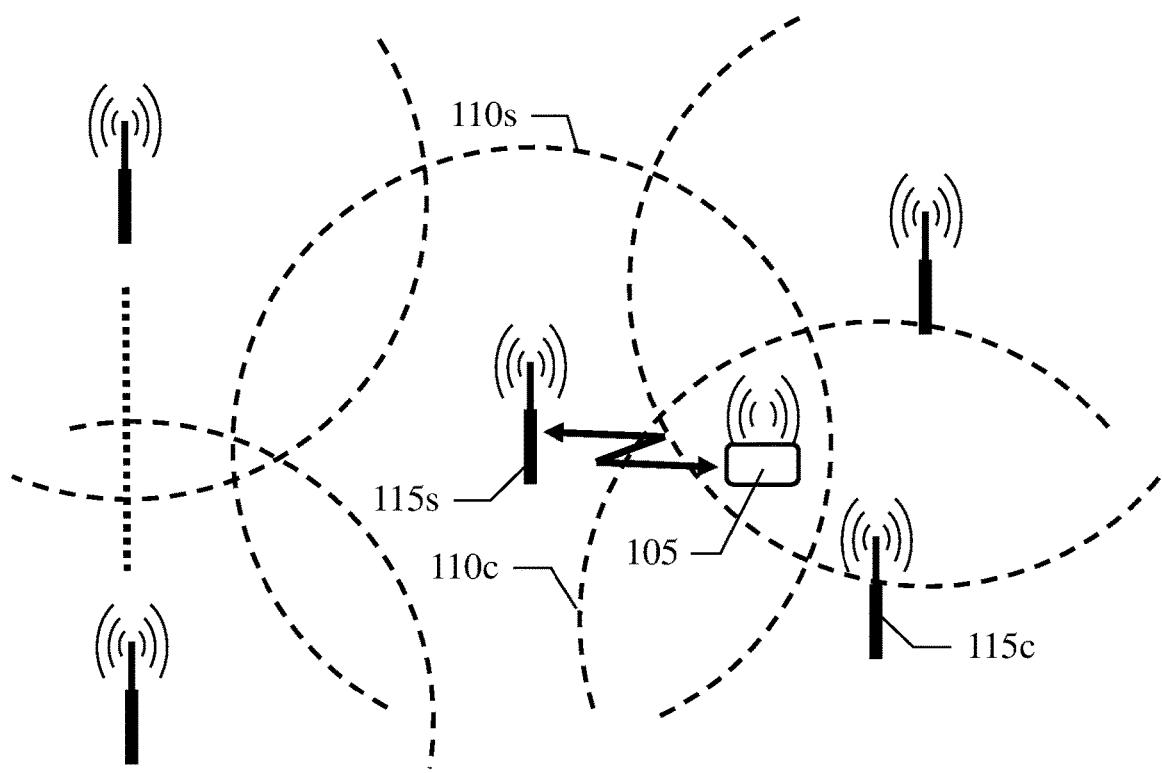
FIG. 1F is a diagram illustrating an exemplary situation in which a handover is allowed by the client computing device according to an embodiment of the present disclosure.

Conversely, FIG. 1F shows a different situation in which a game program is running. In this case, the handover is allowed. Therefore, the client 105 connects to the selected wireless network 110*s* implemented by the networking device 115*s* and then disconnects from the current wireless network 110*c* implemented by the networking device 115*c*.

The above-described solution avoids, or at least substantially reduces, the risk of performing handovers that are counterproductive. As a result, it is possible to limit the handovers to the ones that are actually useful. This reduces network traffic, with a beneficial effect on performance. Moreover, this reduces power consumption (especially important for clients which devices are battery-operated, such as mobile stations).

In the same solution, the wireless network to which the client is connected may self-adapt dynamically to actual needs of the client over time (thereby having the client connected to the most appropriate wireless network at every moment). This allows spreading the clients in a same area throughout all the available wireless networks efficiently, so as to avoid (or at least substantially reduce) the risk of overloading some wireless networks while other ones remain under exploited.

All of the above provides better user's experiences, higher client interactions and increased customer satisfactions.

Figure 2:
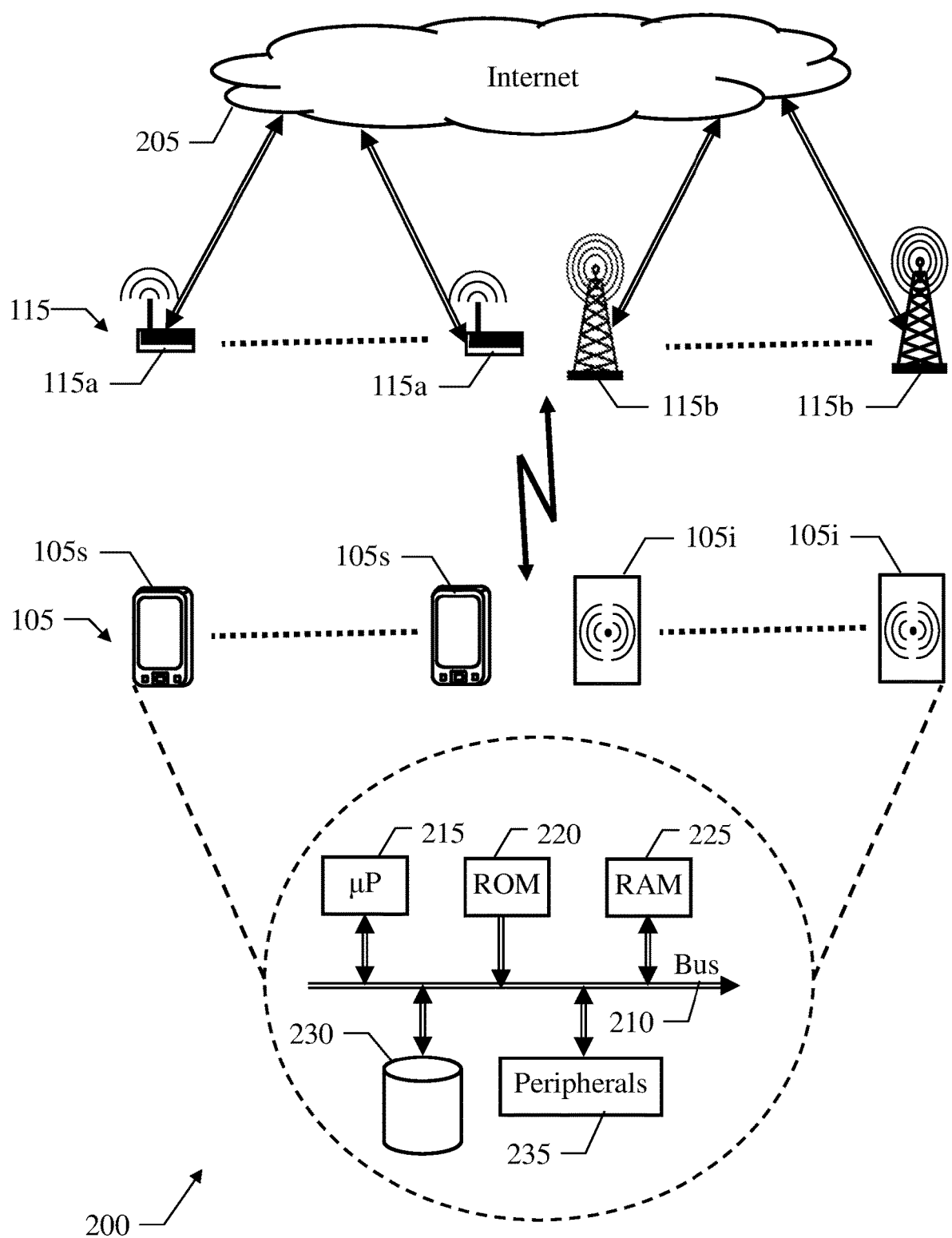
FIG. 2 shows a schematic block diagram of an information technology infrastructure that may be used to implement the solution, according to an embodiment of the present disclosure.

With reference now to FIG. 2, a schematic block diagram is shown of an information technology infrastructure 200 that may be used to implement the solution according to an embodiment of the present disclosure.

The information technology infrastructure 200 includes one or more instances of the above-mentioned client 105. For example, the one or more clients 105 may be smartphones, differentiated with the reference 105*s*. The smartphones 105*s* are mobile telephones, which allow performing voice calls as usual but that further provide multi-purpose computing functionalities comparable to the ones of standard computers. Additionally or alternatively, the one or more clients 105 may be IoT devices, differentiated with the reference 105*i*. The IoT devices 105*i* are physical objects different from computers (and traditionally non-Internet-enabled) to which Internet connectivity has been added (such as medical devices, appliances, vehicles and so on).

Moreover, the information technology infrastructure 200 includes the above-mentioned networking devices 115. The networking devices 115 implement the corresponding wireless networks to which the one or more clients 105 may connect; in turn, the networking devices 115 are connected to a global network implementing the Internet 205. For example, the networking devices 115 may be access points (such as of Wi-Fi type), differentiated with the reference 115*a*. The access points 115*a* are used to connect the one or more clients 105 within their transmission range into the corresponding (wireless) Wi-Fi networks based on the IEEE 802.11 specification. The access points 115*a* are also connected to a landline telephone network and through it to Internet Service Providers (ISPs), not shown in the figure, providing access to the Internet 205. The access points 115*a* may be private; in this case, the access points 115*a* are protected (closed) so as to limit the connection thereto (for example, via corresponding passwords). Conversely, the access points 115*a* may be public; in this case, the access points 115*a* are unprotected (open), so as to allow the connection thereto unconditionally and then the access to the Internet 205 freely or via a captive portal that is displayed before granting it (for example, used to perform an authentication, requiring a registration, asking for acceptance of use policy or simply showing a welcome message). Additionally or alternatively, the networking devices 115 may be base stations 115*b*, for example, of 3G/4G type. The base stations 115*b* define cells providing a very large territorial coverage of corresponding (wireless) mobile networks based on the 3G/4G specification. Each mobile network allows connection thereto by the one or more clients 105 using a corresponding mobile telephone operator for exploiting services offered by it (including access to the Internet 205 as far as relevant to the present disclosure). The base stations 115*b* are connected to corresponding core networks, and through them to Internet service providers (not shown in the figure) providing access to the Internet 205.

Each of the one or more clients 105 includes several units that are connected among them through a bus structure 210 at one or more levels (with an architecture that is suitably scaled according to a type associated with the one or more clients 105). Particularly, a microprocessor (µP) 215 provides a logic capability of the one or more clients 105. A non-volatile memory (ROM) 220 stores basic code for a bootstrap of the one or more clients 105 and a volatile memory (RAM) 225 is used as a working memory by the microprocessor 215. Each of the one or more clients 105 is provided with a mass-memory 230 for storing programs and data (for example, a flash E$^2$PROM). Moreover, each of the one or more clients 105 includes a number of controllers for peripherals, or Input/Output (I/O) units, 235; for example, the peripherals 235 include a Wireless Network Interface Card (WNIC) of the Wi-Fi type for communicating with the access points 115*a*, a mobile telephone transceiver (TX/RX) for communicating with the base stations 115*b* and a satellite receiver of geo-localization signals (for example, of GPS type). Moreover, the peripherals 235 of each smartphone 105*s* further include a camera (for acquiring images/videos), a microphone (for acquiring audios) and a touch-screen (for displaying information and entering commands/data), whereas the peripherals 235 of each IoT device 105*i* further include one or more sensors (for collecting data, such as a thermometer, a radar, an accelerometer and so on) and/or actuators (for controlling a physical system, such as a switch, a valve, a motor and so on).

Figure 3:
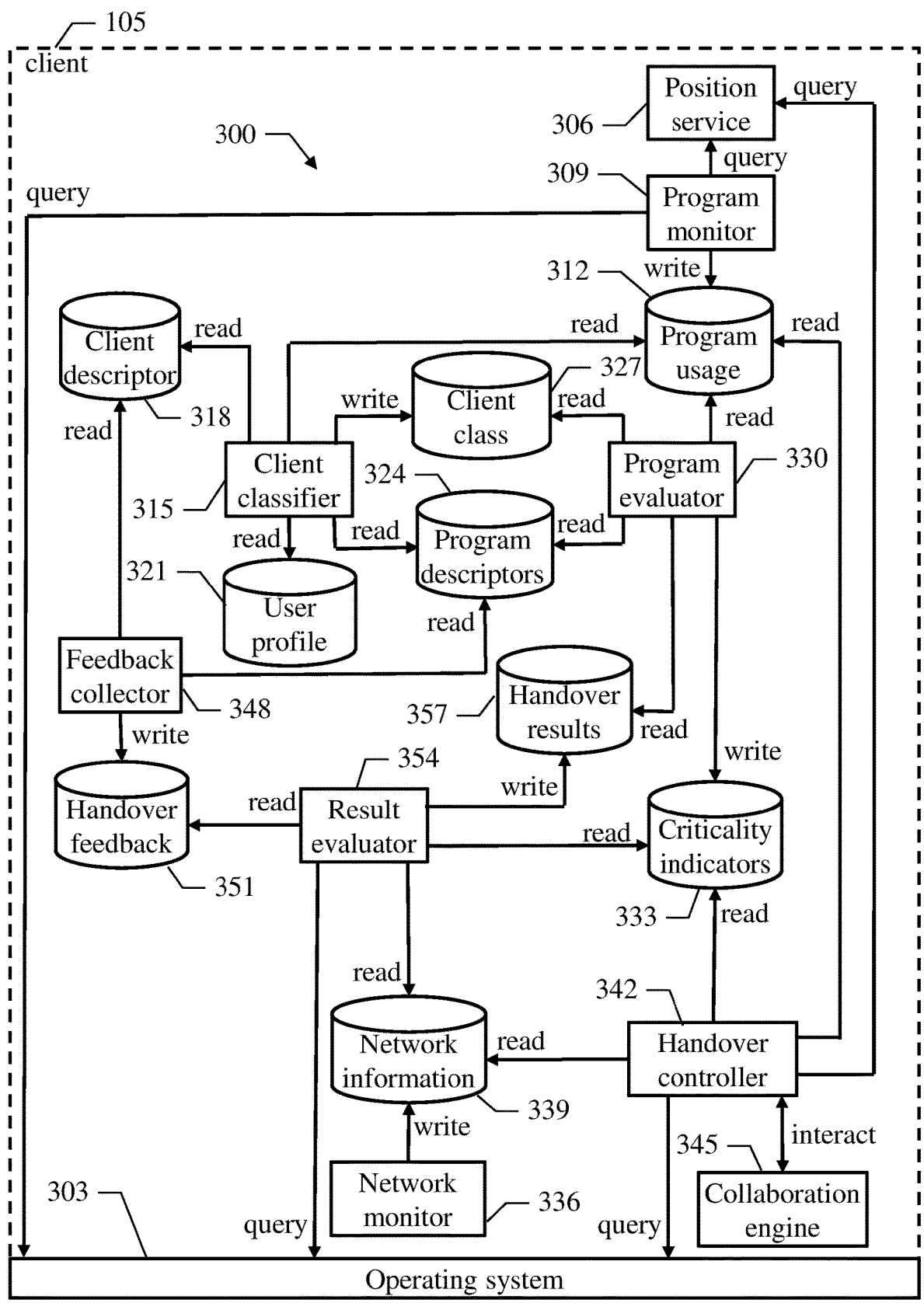
FIG. 3 shows main software components that may be used to implement the solution, according to an embodiment of the present disclosure.

With reference now to FIG. 3, main software components to implement the proposed solution for controlling handovers are shown, according to an embodiment of the present disclosure.

Particularly, all the software components (programs and data) are denoted as a whole with the reference 300. The software components 300 are typically stored in the mass memory and loaded (at least partially) into the working memory of each client 105 (only one shown in the figure) when the programs are running, together with other application programs not directly relevant to the solution of the present disclosure (thus omitted in the figure for the sake of simplicity). The programs are installed into the mass memory, for example, at the factory or by downloading them from the Internet. In this respect, each program may be a module, segment or portion of code, which includes one or more executable instructions for implementing the specified logical function.

An operating system 303 (running directly on the hardware of the client 105) defines a software platform on top of which any other software programs may run. A position service 306 exploits the satellite receiver for providing a current position of the client 105. A program monitor 309 monitors the programs running on the client 105. The program monitor 309 queries the operating system 303 and the position service 306. The program monitor 309 writes a program usage repository 312. The program usage repository 312 logs (program) usage information relating to the usage of the programs. For example, for each program the program usage information stores an indication of each start time and each stop time of the program, a history of the position of the client 105 during the running of the program, any unexcepted conditions occurring during the running of the program (for example, warnings caused by performance degradations, interruptions and corresponding Time To Recovery (TTR), errors preventing execution, and the like), a history of a (program) network workload of the program and so on. A client classifier 315 classifies the client 105 into one of a group of pre-defined (client) classes (for example, private, enterprise, health, diagnostic, driving and so on). The client classifier 315 reads the program usage repository 312, a client descriptor repository 318, a user profile repository 321 and a program descriptors repository 324. The client descriptor repository 318 stores a client descriptor containing static information relating to the client 105 (being populated initially from meta-data of the client set at the factory). For example, the client descriptor indicates a (client) type of the client 105; the client type specifies a (client) category of the client 105 (such as smartphone, tablet, laptop, IoT device like medical device, appliance and the like), a possible (client) interface of the client 105 (such as touch-screen, monitor, camera, microphone, loud-speaker and the like) and so on. The user profile repository 321 stores a user profile of a user of the client 105, if any (being populated by the user manually). For example, the user profile indicates job, working time, workplace, residence and so on of the user (provided that the user has given the required authorizations). It should be noted that data collection (e.g., from IoT devices or sensors) is done with user consent via, for example, an opt-in and opt-out feature. Additionally, user(s) can choose to stop having his/her information being collected or used. In some embodiments, user(s) can be notified each time data is being collected. The collected data is envisioned to be secured and not shared with anyone without previous consent. User(s) can stop data collection at any time.

The program descriptors repository 324 stores a program descriptor of each program that is installed on the client 105 (possibly limited to the programs that are relevant to the present disclosure as involving a significant access to the Internet). The program descriptor contains static information relating to the corresponding program (being populated at its installation from meta-data of the program and being purged at the deinstallation of the program). For example, the program descriptor indicates a (program) type of the program. The program type specifies a category of the program, a function of the program and so on. Particularly, the program may be an application, which is installed and managed by the user (running in the foreground so as to involve corresponding interactions with the user). Conversely, the program may be a service, which is installed and managed without involvement of the user (running in the background without involving any user's interaction). Moreover, the program may be used to implement videoconference, VPN, streaming, game, gauge, control and the like. The client classifier 315 writes a client class register 327. The client class register 327 stores an indication of the client class. A program evaluator 330 (for example, implemented by a machine learning model) evaluates corresponding criticality indicators of the (relevant) programs that are installed on the client 105. The program evaluator 330 reads the program usage repository 312, the program descriptors repository 324 and the client class register 327. The program evaluator 330 writes a program criticality repository 333. The program criticality repository 333 stores the criticality indicators of the programs (for example, ranging from 0 to 100 for increasing criticality of the programs). A network monitor 336 monitors the wireless networks that are available to the client 105. The network monitor 336 writes a network information repository 339. The network information repository 339 contains information about the available wireless networks. For example, the network information repository 339 has an entry for each available wireless network. The entry stores an indication of a (network) type of the available wireless network (such as Wi-Fi, 3G, 4G, 5G and the like), its connection type such as open or closed, direct or subject to a captive portal, and the like), (network) performance information thereof (such as connection quality, available bandwidth, response time and the like) and so on.

A handover controller 342 controls the handovers of the client 105. The handover controller 342 queries the operating system 303 and the position service 306. The handover controller 336 reads the program usage repository 312, the program criticality repository 333 and the network information repository 339. The handover controller 342 interacts with a collaboration engine 345. The collaboration engine 345 communicates with the other clients (not shown in the figure) that are present in a (distribution) area around the client 105 to add a collaborative functionality to the control of the handovers. A feedback collector 348 collects a (handover) feedback of each handover, as defined by subjective information (of a possible user of the client 105) and/or objective information (of the running programs of the client 105). The feedback collector 348 reads the client descriptor repository 318 and the program descriptors repository 324. The feedback collector 348 writes a handover feedback register 351. The handover feedback register 351 contains an indication of the handover feedback to a last handover that has been performed; for example, the handover feedback is a binary value that may be either positive or negative. A result evaluator 354 evaluates a (handover) result of each handover, as cleaned from any reasons alien to factors actually relating to the connection to the corresponding wireless network. The result evaluator 354 queries the operating system 303, and it reads the criticality indicator repository 333, the network information repository 339 and the handover feedback repository 351. The result evaluator 354 writes a handover result repository 357, which is read by the program evaluator 330. The handover result repository 357 logs the handover results of the handovers that have been performed. Each handover result contains a value that may be positive, negative or uncertain.

Figure 4A:
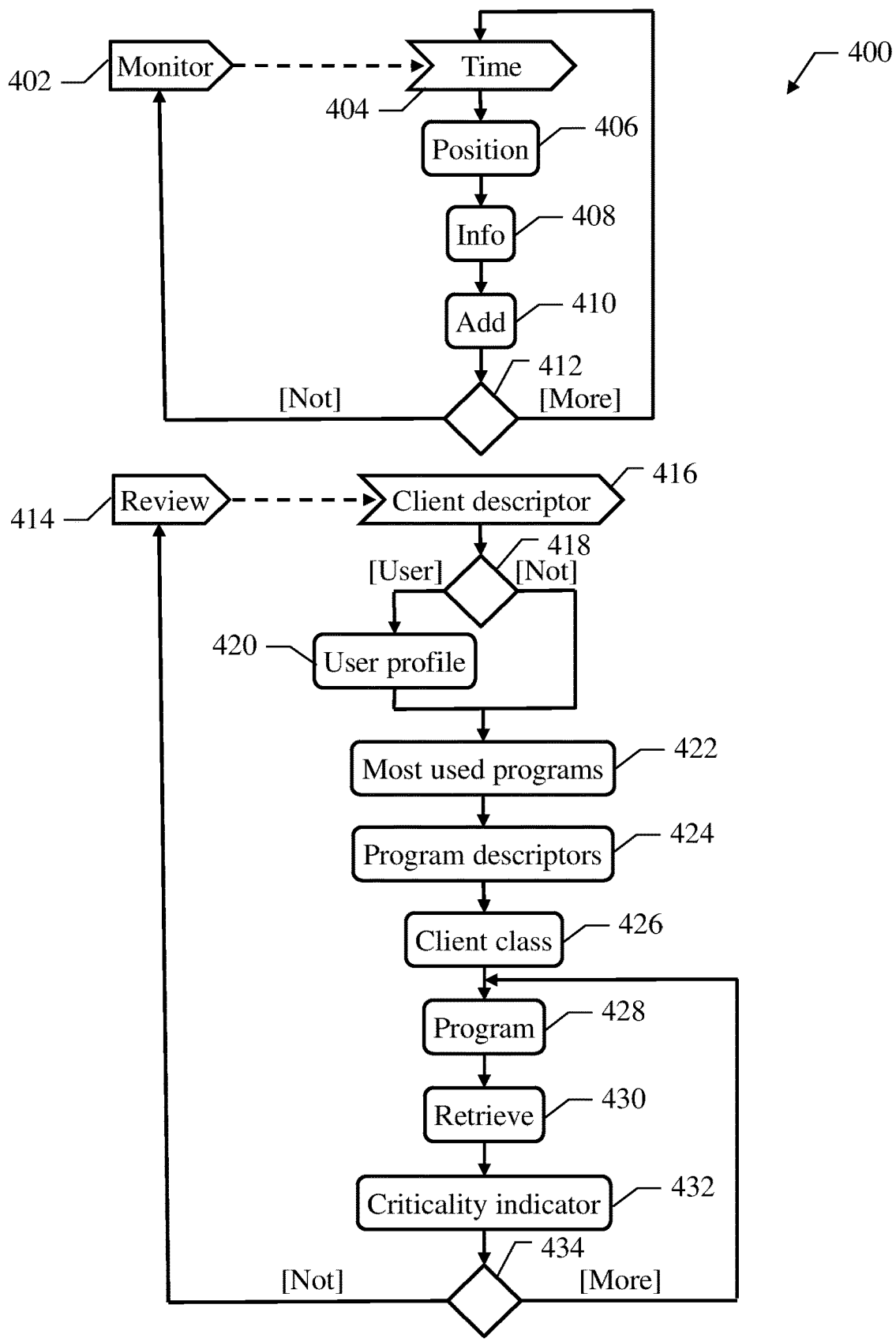
FIG. 4A is a flowchart depicting the steps of a method for controlling handovers, according to an embodiment of the present disclosure.
Figure 4B:
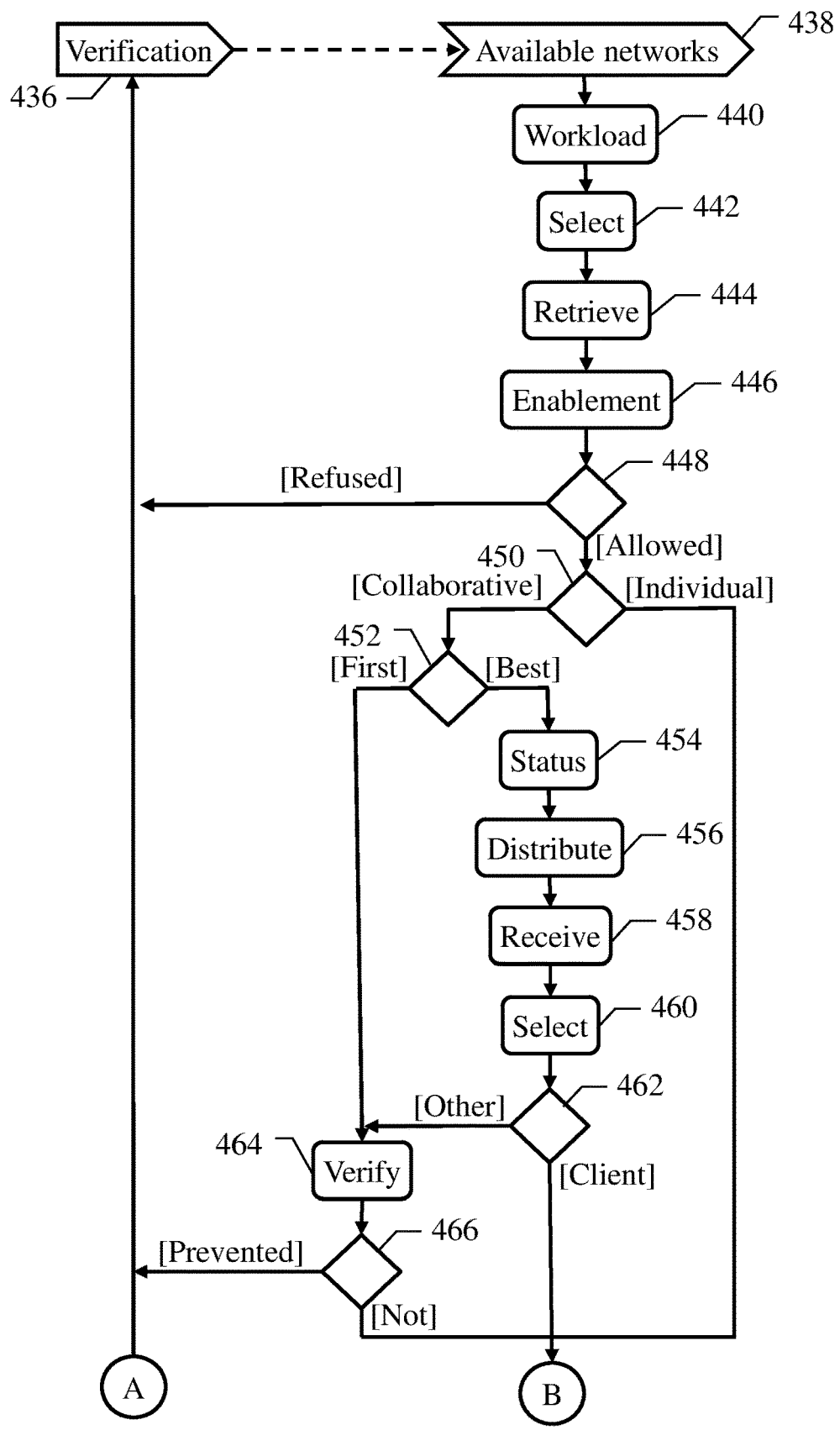
FIG. 4B is a flowchart depicting the steps of a method for controlling handovers, according to an embodiment of the present disclosure, according to an embodiment of the present disclosure.
Figure 4C:
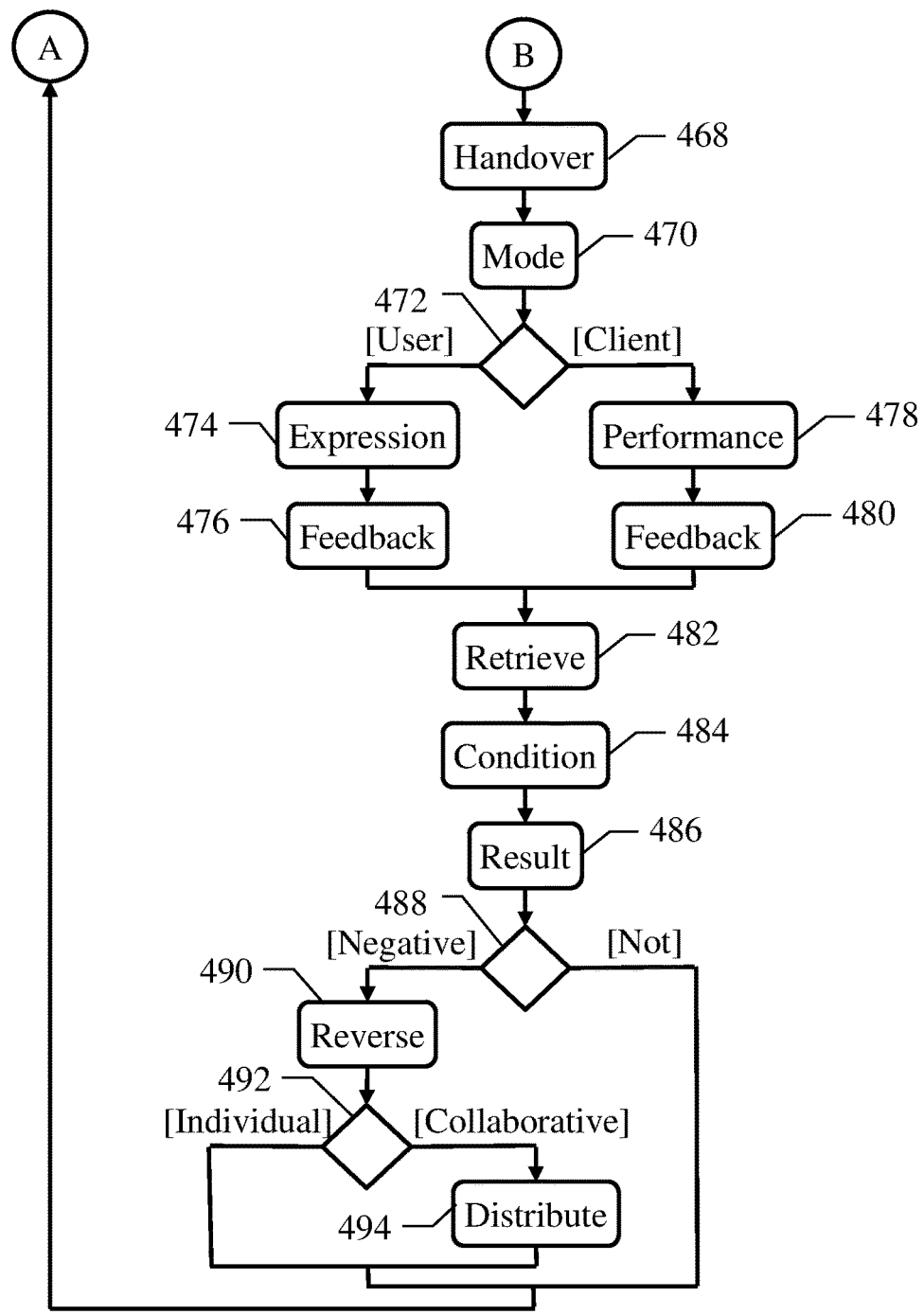
FIG. 4C is a flowchart depicting the steps of a method for controlling handovers, according to an embodiment of the present disclosure, according to an embodiment of the present disclosure.

With reference now to FIGS. 4A-4C, an activity diagram is shown describing the flow of activities relating to an implementation of the solution for controlling handovers, according to an embodiment of the present disclosure.

Particularly, the diagram represents an exemplary process that may be used to control handovers of a generic client with a method 400. In this respect, each block may correspond to one or more executable instructions for implementing the specified logical function on the client.

The process passes from block 402 to block 404 as soon as a monitoring of the (relevant) programs is required. For example, this may happen periodically (such as every 1-10 s) or whenever the program monitor receives a corresponding notification (such as for the start/stop of a program, an unexpected condition thereof and so on). In response thereto, if necessary, the program monitor determines a current time (by querying the operating system). The program monitor at block 406 determines a (current) position of the client (by querying the position service). The program monitor at block 408 determines the information of interest (for example, start/stop of a program, unexpected condition of a program, network workload of a program and so on). The program monitor at block 410 adds a corresponding entry to the program usage repository; the entry contains a time-stamp (set to the current time), an indication of the position of the client and the information so determined. The program monitor at block 412 verifies whether further pieces of information are to be logged. If so, the process returns to block 404 to repeat the same operations described above. Conversely, the process returns to block 402 waiting for a next monitoring of the programs.

In a completely independent way, the process passes from block 414 to block 416 as soon as a review of the criticality indicators is required. For example, this may happen periodically (such as every 6-24 hours) or whenever the client is subject to a significant change being relevant to the process at issue (such as an update of the user profile, the installation/deinstallation of a program and so on). In response thereto, the client classifier retrieves the client descriptor (client type) from the corresponding repository. The process branches at block 418 according to the client category specified in the client type. If the client category indicates that the client is operated by a (human) user, for example, in case of a smartphone, a tablet, a laptop and so on, the client classifier at block 420 retrieves the user profile (if any) from the corresponding repository. The process then continues to block 422; the same point is also reached directly from block 418 if the client is not operated by a user (for example, in case of a IoT device). At this point, the client classifier determines the most used programs by the client. For example, the client classifier calculates a (program) usage frequency of the programs according to their start times and stop times retrieved from the program usage repository (for example, set for each program to an average of its running time during each day); the client classifier then identifies the most used programs accordingly (for example, the one with the highest usage frequency and any other ones having the usage frequencies differing from the highest usage frequency by less than a threshold value, such as 5-20%. The client classifier at block 424 retrieves the program descriptors (program type) of the most used programs (from the corresponding repository). The client classifier at block 426 determines the client class according to the above-mentioned information, and saves it into the corresponding register. For example, a smartphone that is most used to perform videoconferences at the workplace and during the working time of its user is classified as "enterprise", a laptop that is most used to perform videoconferences at the residence and outside the working time of its user is classified as "private", a sensor that measures blood pressure continuously is classified as "health", a sensor that measures blood pressure once a hour is classified as "diagnostic" and so on.

A loop is then entered at block 428, where the program evaluator takes a (current) program into account (starting from a first one in any arbitrary order among all the relevant ones that are installed on the client as indicated in the program descriptors repository). The program evaluator at block 430 retrieves the client class, the program descriptor (program type), the program usage information (start/stop times, positions) and the handover results relating to the program (from the corresponding repositories). The program evaluator at block 432 determines the criticality indicator of the program according to the information so retrieved, and saves it into the corresponding repository. For example, factors that contribute to increase the criticality indicators are the client class indicating that the client is used for important purposes (such as enterprise, driving and the like), the programs being applications (running in the foreground), the programs performing important functions (such as videoconference, vital parameters control, real-time driving operations and the like), the programs mostly running during important periods (such as working time), the programs having experienced many negative results of the handovers (while running) and so on; conversely, factors that contribute to decrease the criticality indicators are the client class indicating that the client is used for non-important purposes (such as private, domotics and the like), the programs being services (running in the background), the programs performing non-important functions (such as audio streaming, game and the like), the programs mostly running during non-important periods (such as holidays), the programs having experienced few negative results of the handovers (while running) and so on. The program evaluator at block 434 verifies whether a last program has been processed. If not, the process returns to block 428 to repeat the same operations on a next program. Conversely, once all the programs have been processed, the loop is exit by returning to block 414 waiting for a next review of the criticality indicators.

In a completely independent way, the process passes from block 436 to block 438 as soon as a verification of the wireless networks is required. For example, this may happen periodically (such as every 1-5 s), whenever a further type of network connectivity (such as Wi-Fi, 3G-4G and so on) is enabled and/or whenever a connection quality of the (current) wireless network to which the client is currently connected becomes too poor. In response thereto, the handover controller retrieves a list of the available wireless networks (by querying the operating system, which determines them by listening for corresponding beacon signals). The handover controller at block 440 identify the running programs that are currently running on the client (by querying the operating system); the handover control than retrieves the (current) network workloads of the running programs (from the program usage repository). The handover controller at block 442 determines the (selected) wireless network, among the available wireless network, that is best suited for a possible handover from the current wireless network. Particularly, the selected wireless network is the one having the lowest network performance meeting the network workloads of the running programs. In this way, the client self-adapts the connection to the available wireless networks dynamically according to its actual needs. For example, an IoT device may have different sensors and corresponding services that collect data and upload them to a server: a (less-demanding) service processes few data with high frequency and a (more-demanding) service processes many data with low frequency. In this case, whenever the more-demanding service is uploading the corresponding data the handover controller identifies a selected wireless network with high network performance; as soon as the more-demanding service has completed the operation (or it is turned off), the handover controller identifies a selected wireless network with lower network performance (anyway sufficient for the less-demanding service). As a result, it is possible to avoid overloading the wireless network with high network performance uselessly. This significantly reduces the risk of clogging this wireless network and then reducing its network performance for possible other clients having more demanding requirements.

The handover controller at block 444 retrieves the criticality indicators of the running programs (from the corresponding repository). The handover controller determines the most critical running program having the highest criticality indicator. The handover controller retrieves the current time (by querying the operating system), the current position of the client (by querying the position service), the network information (network type) of the selected wireless network and the program usage information (unexpected conditions) of the most critical running program in a time window (for example, 10-60 s) following any previous handovers to the selected wireless network (from the corresponding repositories). The handover controller at block 446 determines a handover enablement (allowed/refused) of the handover from the current wireless network to the selected wireless network according to the retrieved information. For example, factors that contribute to allow the handover are a low criticality indicator of the most critical running program, a low number/severity of the unexpected conditions of the most critical running program, a connection type of the selected wireless network being direct and so on. Conversely, factors that contribute to refuse the handover are a high criticality indicator of the most critical running program, a high number/severity of the unexpected conditions of the most critical running program, a connection type of the selected wireless network being subject to a captive portal and so on. In this way, it is possible to reduce the risk of interrupting critical programs, whose execution with stable/reliable network connection is crucial. The flow of activity branches at block 448 according to the handover enablement. If the handover has been refused, the process returns to block 436, waiting for a next verification of the wireless networks. Conversely, if the handover has been allowed, the process continues to block 450. For example, a user is making a business videoconference on his/her smartphone (connected to a mobile network) while waiting for a train on a platform. Meanwhile, a train belonging to a company that has been used in the past by the user (connecting to its Wi-Fi network implementing a captive portal) passes or stops nearby. In this situation, the handover to this Wi-Fi network is refused, so as to avoid interrupting the business videoconference. In the same situation, the train to be taken by the user arrives. Assuming that its Wi-Fi network may be accessed directly (since the user has already registered the corresponding ticket), the handover thereto is instead allowed.

With reference now to block 450, the flow of activity branches according to an operative mode of the handover controller (for example, set manually during a configuration thereof, selected dynamically with a possible default value or the only one available). If the handover controller operates in a collaborative way (together with other possible clients in a same area), the flow of activity further branches at block 452 according to an operative mode of the collaborative engine (for example, again set manually during a configuration thereof, selected dynamically with a possible default value or the only one available). If the handover has to be tried by the best suitable client, the collaborative engine at block 454 collects, via the handover controller, (client) status information of the client. The client status information is based on the program usage information and the criticality indicators; for example, the client status information includes the criticality indicator of the most critical running program and its running time (from the last start time to the current time). The collaborative engine at block 456 distributes a handover announcement in a distribution area around it. The handover announcement indicates the intention of the (current) client to perform the handover. The handover announcement includes an indication of the selected wireless network and the client status information. For example, this result is achieved by broadcasting the handover announcement within a transmission range of the current client (such as 10-100 m) or by submitting the handover announcement to the networking device of the current wireless network, which networking device in turn broadcasts it within its transmission range. The collaborative engine at block 458 receives (further) handover announcements that are likewise distributed by any other clients around the current client. The collaboration engine at block 460 selects the (selected) client which has to try the handover to the selected wireless network according to the handover announcements relating to the selected wireless network. The selected client is chosen, among all the (current/other) clients that intend to perform the handover to the selected wireless network, according to their client status information. For example, the selected client is the one having the most critical running program with the lowest criticality indicator and/or that is running by the shortest/longest time. In this way, the handover is tried on the selected client where a possible negative result thereof should be less harmful. The flow of activity branches at block 462 according to the selected client. If the handover has to be tried by another client (selected client different from the current client), the process continues to block 464. The same point is also reached from block 452 if the handover has to be tried by the first suitable client. At this point the collaboration engine verifies whether any matching prevention message has been received from other clients around the current client (as described in the following). Each prevention message that is received includes an indication of a wireless network and of a criticality indicator. The prevention message has been distributed by the corresponding other client when the handover result (of a handover to this wireless network with this criticality indicator of its most critical running program on the other client) is negative, to signify that further handovers in the same situation are to be prevented. The prevention massage is deemed matching when its wireless network is equal to the selected wireless network of the current client and its criticality indicator matches the criticality indicator of the most critical running program of the current client (for example, their difference is lower than a threshold value, such as 5-10% of the last one). The process branches at block 466 according to a result of this verification. If a matching prevention message (or more) has been received, the process returns to block 436 waiting for a next verification of the wireless networks. In this way, it is possible to reduce (down to a single one) the number of clients that perform a same handover whose handover result is likely to be negative.

The flow of activity merges again at block 468 from block 450 (if the handover controller operates in an individual way), from block 462 (if the handover has to be tried by the current client, being equal to the selected client) or from block 466 (if no matching prevention message has been received after a certain waiting time, such as 1-2 s). At this point, the handover controller allows the handover, which is then performed as usual (i.e., by connecting to the selected wireless network and then disconnecting from the current wireless network). The feedback collector at block 470 retrieves the program descriptor (program type) of the most critical running program and the client descriptor (client interface) from the corresponding repositories. The feedback collector then determines a collection mode of the handover feedback according to the information so retrieved. For example, the handover feedback is to be collected from the user when the most critical running program is an application and the client has one or more peripherals for acquiring (user) expressions of its user (such as camera, microphone and so on). Conversely, the handover feedback is to be collected from the client when the most critical running program is a service and/or the client has no peripheral of this type. The flow of activity branches at block 472 according to the collection mode so determined. If the collection mode is from the user, the feedback collector at block 474 registers the user expression in a verification time window following the handover (for example, for 10-60 s). For example, the feedback collector registers a video of a face and/or an audio of a voice of the user. The feedback collector then applies sentiment analysis techniques to estimate sentiments expressed in the video/audio by the user (e.g., using image recognition, natural language and machine learning techniques). The feedback collector at block 476 determines the handover feedback (of the user) according to the user expression, and saves it into the corresponding register. For example, if the user has expressed impatience, complaint, anger and so on repeatedly (such as by facial motions and/or uttered words), the handover feedback is negative, whereas otherwise the handover feedback is positive. With reference again to block 472, if the collection mode is from the client the feedback collector at block 478 registers (program) performance information relating to the usage of the most critical running program in the same verification time window following the handover. For example, the program performance information includes execution metrics (such as response time, downloading/uploading speed and the like), warnings/errors and so on. The feedback collector at block 480 determines the handover feedback (of the client) according to the program performance information, and saves it into the corresponding register. For example, if one or more execution metrics fall below corresponding threshold values repeatedly and/or if warnings/errors have occurred the handover feedback is negative, whereas otherwise the handover feedback is positive. The flow of activity merges again at block 482 from block 476 or block 480. At this point, the result evaluator retrieves an indication of the running programs that are currently running on the client and of (client) resource consumption of the client, such as its microprocessor and working memory (by querying the operating system), their criticality indicators and the network information (network performance information) relating to the verification time window. The result evaluator at block 484 evaluates a (client) operative condition of the client relating to the access to the Internet in the verification time window. For example, a positive operative change is detected when the network performance information of the selected wireless network increases by more than a (network) threshold value (such as 40-60%), the client resource consumption of the client decreases by more than a (resource) threshold value (such as 40-60%) and/or the criticality indicator of the most critical running program decreases by more than a (program) threshold value (such as 40-60%) in the verification time window; vice-versa, a negative operative change is detected when the network performance information of the selected wireless network decreases by more than the network threshold value, the client resource consumption of the client increases by more than the resource threshold value and/or the criticality indicator of the most critical running program increases by more than the program threshold value in the verification time window. The result evaluator at block 486 determines a handover result of the handover from the handover feedback (retrieved from the corresponding register) according to the client operative condition so determined, and adds it to the corresponding repository. Particularly, if the handover feedback is positive and no positive operative change has been detected the handover result is set to positive, if the handover feedback is positive and a positive operative change has been detected the handover result is set to uncertain, if the handover feedback is negative and no negative operative change has been detected the handover result is set to negative, and if the handover feedback is negative and a negative operative change has been detected the handover result is set to uncertain. In this way, the handover feedback is positive/negative when it is very likely that the decision of allowing the handover has been correct (since the client operative condition when the decision has been taken and when the handover result has been determined are substantially the same). The handover feedback is instead uncertain when it is not possible to ascertain whether the decision of allowing the handover has been correct/wrong (since the client operative condition when the decision has been taken and when the handover result has been determined have changed substantially, so that the handover feedback may be due either to the decision of performing the handover to the selected wireless network or to the change of the client operative condition).

The flow of activity branches at block 488 according to the handover result (retrieved from the corresponding repository by the handover controller). If the handover result is negative (meaning that the decision to perform the handover has been wrong), the handover controller at block 490 reverses the handover, by re-connecting to the (previous) current wireless network and then disconnecting from the selected wireless network. At the same time, it is also possible to re-train the handover controller (by using a training set based on the information relating to the previously performed handovers). The flow of activity branches at block 492 again according to the operative mode of the handover controller. If the handover controller operates in the collaborative way, the handover controller at block 494 commands the collaboration engine to distribute the corresponding prevention message (comprising the indication of the selected wireless network and of the criticality indicator of the most critical running program) as above (by broadcasting or via the networking device of the current wireless network). The process then returns from block 494, from block 492 (if the handover controller operates in the individual way) or from block 488 (if the handover result is positive or uncertain) to block 436 waiting for a next verification of the wireless networks.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced even without the specific details (such as the numerical values) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. Moreover, items presented in a same group and different embodiments, examples or alternatives are not to be construed as de facto equivalent to each other (but they are separate and autonomous entities). In any case, each numerical value should be read as modified according to applicable tolerances; particularly, unless otherwise indicated, the terms "substantially", "about", "approximately" and the like should be understood as within 10%, preferably 5% and still more preferably 1%. Moreover, each range of numerical values should be intended as expressly specifying any possible number along the continuum within the range (comprising its end points). Ordinal or other qualifiers are merely used as labels to distinguish elements with the same name but do not by themselves connote any priority, precedence or order. The terms include, comprise, have, contain, involve and the like should be intended with an open, non-exhaustive meaning (i.e., not limited to the recited items), the terms based on, dependent on, according to, function of and the like should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for controlling handovers of a client computing device. However, the client computing device may be of any type (see below) and its handovers may be controlled in any way (for example, simply allowing/refusing them, further selecting the corresponding wireless networks and so on).

In an embodiment, the handovers are among a plurality of wireless networks. However, the wireless networks may be in any number and of any type (for example, Wi-Fi, 3G, 4G, 5G, WiMax and so on).

In an embodiment, the wireless networks provide access to a service network. However, the service network may be of any type (for example, a global, wide area or local area network based on any kind of wired or wireless connections such as optical cables, telephone lines, satellite connections and so on).

In an embodiment, the method includes monitoring (by the client computing device) corresponding program usage information relating to the access to the service network of one or more software programs being installed on the client computing device. However, the program usage information may be of any type (for example, partial, different and additional pieces of information with respect to the ones mentioned above) and it may be monitored in any way (for example, asynchronously, synchronously and so on).

In an embodiment, the method includes determining (by the client computing device) corresponding criticality indicators of the software programs. However, the criticality indicators may be of any type (for example, continuous, discrete, with the more critical each software program the higher/lower the corresponding criticality indicator and so on).

In an embodiment, the criticality indicator of each of the software programs is determined according to the program usage information of the software program. However, the criticality indicator may be determined in any way (for example, with a neural network, a generative model, a genetic algorithm and so on).

In an embodiment, the method includes detecting (by the client computing device) one or more available wireless networks of the wireless networks being available for a current one of the handovers thereto from a current one of the wireless networks to which the client computing device is currently connected. However, the available wireless networks may be in any number and of any type (for example, only known wireless networks already used in the past, every wireless networks and so on). Moreover, the available wireless networks may be detected in any way (for example, by listening for corresponding beacons, by broadcasting an interrogation signal and waiting for corresponding responses, and so on).

In an embodiment, the method includes controlling (by the client computing device) the current handover from the current wireless network to a selected wireless network of the available wireless networks. However, the selected wireless network may be determined in any way (for example, simply according to connection quality, further according to partial, different and additional pieces of information with respect to the ones mentioned above, and so on).

In an embodiment, the current handover is controlled according to the criticality indicators of one or more running software programs of the software programs being currently running on the client computing device. However, this operation may be performed in any way (for example, with a neural network, a generative model, a genetic algorithm and so on, by taking into account the most critical running software program only, by grouping the running software programs according to possible inter-dependency among them, by weighting a contribution of the more critical running software programs, up to all of them, and so on).

Further embodiments provide additional advantageous features, which may however be omitted at all in a basic implementation.

In an embodiment, the method includes enabling (by the client computing device) the current handover according to the criticality indicators of the running software programs. However, the current handover may be enabled in any way (for example, by allowing/refusing it automatically, requiring a user confirmation always or only in uncertain conditions, such as when a corresponding enablement indicator reaches or not, respectively, a threshold value, and so on).

In an embodiment, the method includes monitoring (by the client computing device) the program usage information of the software programs comprising corresponding program usage periods, program usage locations, program unexpected conditions and/or program network workload of the software programs. However, the program usage information may include any type of program usage periods (for example, start/stop times, durations and so on), program usage locations (for example, geographical coordinates, areas, location names and so on), program unexpected conditions (for example, warnings, interruptions, errors and so on) and program network workload (for example, used bandwidth, amount of uploaded/downloaded data and so on).

In an embodiment, the method includes determining (by the client computing device) the criticality indicators of the software programs further according to corresponding program types of the software programs. However, the program types may have any values (for example, program category, such as application, service, tool and the like, function and so on).

In an embodiment, the method includes determining (by the client computing device) a client class of the client computing device. However, the client class may be of any type (for example, partial, different and additional client classes with respect to the ones mentioned above, and so on).

In an embodiment, the client class is determined according to a client type of the client computing device, a user profile of a user of the client computing device and/or program usage frequencies of the software programs. However, the client class may be determined in any way (for example, with Conditional Random Fields, Markov Random Fields, decision trees, k-nearest neighbors and so on techniques); the client class may be determined according to any type of client type (for example, computing device, IoT device and so on), user profile (for example, indicating locations, working time, profession and so on) and program usage frequency (for example, per day, week, month over any last period, and so on).

In an embodiment, the method includes determining (by the client computing device) the criticality indicators of the software programs further according to the client class of the client computing device. However, this operation may be performed in any way (for example, by simply adding the client class as a further input to the program evaluator, by conditioning how other pieces of information are treated and so on).

In an embodiment, the method includes determining (by the client computing device) the current handover further according to a current time and/or a current location of the client computing device. However, the current handover may be controlled according to any type of current time and current location (for example, either the same or different with respect to above).

In an embodiment, the method includes determining (by the client computing device) corresponding connection types of the available wireless networks. However, the connection types may have any value (for example, open/closed, direct or with captive portal and so on).

In an embodiment, the method includes controlling (by the client computing device) the current handover further according to the connection types of the available wireless networks. However, this operation may be performed in any way (for example, by using the connection type to enable/refuse the connection, to select the wireless network and so on).

In an embodiment, the method includes determining (by the client computing device) a handover feedback of the current handover in a verification time window following the current handover. However, the handover feedback may be determined in any way (for example, from subjective information, objective information and so on) in a verification time window of any length.

In an embodiment, the method includes monitoring (by the client computing device) a client operative condition of the client computing device relating to the access to the service network in the verification time window. However, the client operative condition may be defined in any way (for example, by partial, different and additional pieces of information with respect to the ones mentioned above, and so on) and it may be monitored in any way (for example, continuously, only when any negative user expression or program performance information is detected, at the end of the verification time window and so on).

In an embodiment, the method includes determining (by the client computing device) a handover result of the current handover from the handover feedback according to the client operative condition. However, the handover result may be determined in any way (for example, with a machine learning model, a classifier and so on).

In an embodiment, the method includes monitoring (by the client computing device) a user expression of a user of the client computing device in the verification time window. However, the user expression may be of any type (for example, based on videos, audios, commands and so on).

In an embodiment, the method includes determining (by the client computing device) the handover feedback according to the user expression. However, the handover feedback may be determined according to the user expression in any way (for example, with knowledge-based, statistical, hybrid and so on approaches).

In an embodiment, the method includes monitoring (by the client computing device) corresponding program performance information relating to the usage of at least part of the running software programs in the verification time window. However, the performance information may be of any type (for example, partial, different and additional pieces of information with respect to the ones mentioned above, and so on) and it may relate to any running software programs (for example, the most critical running software program, any number of more critical running software programs, all the running software programs and so on).

In an embodiment, the method includes determining (by the client computing device) the handover feedback according to the program performance information. However, the handover feedback may be determined according to the program performance information in any way (for example, simply according to the type of events, weighting them and so on).

In an embodiment, the method includes monitoring (by the client computing device) the client operative condition of the client computing device comprising network performance information of the selected wireless network, a client resource consumption of the client computing device, the running software programs and/or the criticality indicators of the running software programs. However, the client operative condition may be defined by any type of network performance information (for example, bandwidth, response time, signal to noise ratio (SNR) and so on), client resource consumption (for example, microprocessor, working memory, paging rate and so on), running software programs (for example, number, type and so on) and criticality indicators (for example, most critical value, weighed sum of more critical values, up to all, and so on).

In an embodiment, the method includes monitoring (by the client computing device) the program usage information of each of the software programs comprising the handover results of any of the handovers being performed with the software program being running. However, the handover results may be monitored in any way for the software programs (for example, stored separately and associated thereto according to corresponding time stamps, stored together and so on).

In an embodiment, the method includes reversing (by the client computing device) the current handover from the selected wireless network to the current wireless network in response to a negative value of the handover result. However, the current handover may be reversed in any way (for example, automatically, requiring a manual confirmation and so on) according to the handover result (for example, when it is negative, it does not reach a threshold value and so on).

In an embodiment, the method includes distributing (by the client computing device) a prevention message to one or more further client computing devices in a distribution area around the client computing device. However, the prevention message may be distributed in any way (for example, broadcast, via the current networking device, only when the handover result is negative or always, and so on) in any distribution area (for example, within a transmission range of the client computing device, of the current networking device and so on).

In an embodiment, the prevention message includes an indication of the selected wireless network and of the criticality indicators of at least part of the running programs. However, the prevention message may include the criticality indicators of any number of running programs (for example, the most critical running software program, any number of more critical running software programs, all the running software programs and so on), with or without any addition information (for example, the handover result, the handover feedback and so on).

In an embodiment, the method includes receiving (by the client computing device) a further prevention message. However, the further prevention message may be received in any way (for example, in push mode, in pull mode and so on).

In an embodiment, the further prevention message includes an indication of the selected wireless network and of one or more further criticality indicators matching the criticality indicators of the running software programs. However, the criticality indicators may be deemed matching according to any criterion (for example, when they differ by less than any threshold value, down to zero, when they have a same discrete level and so on).

In an embodiment, the method includes refusing (by the client computing device) the current handover in response to the further prevention message. However, the current handover may be refused in any way in response to the further prevention message (for example, indiscriminately, depending on a value of a handover result further contained therein, automatically or requiring a manual confirmation and so on).

In an embodiment, the method includes distributing (by the client computing device) a handover announcement indicative of an intention to perform the current handover in a distribution area around the client computing device. However, the handover announcement may be distributed in any way and in any distribution area (for example, either the same or different with respect to the prevention message).

In an embodiment, the handover announcement includes an indication of the selected wireless network and client status information based on the program usage information and/or the criticality indicators of at least part of the running software programs. However, the client status information may be of any type (for example, containing partial, different and additional pieces of program usage information with respect to the ones mentioned above) and it may relate to any number of running software programs (for example, the most critical running software program, any number of more critical running software programs, all the running software programs and so on).

In an embodiment, the method includes receiving (by the client computing device) corresponding further handover announcements from one or more further client computing devices. However, the further handover announcements may be received in any way (for example, in push mode, in pull mode and so on).

In an embodiment, each of the further handover announcements includes an indication of the selected wireless network and of further client status information based on further program usage information and/or further criticality indicators of at least part of further running software programs being running on the corresponding further client computing device. However, the further handover announcements may be of any type (for example, all the received ones, only the ones with the criticality indicators that are matching according to any criterion, such as either the same or different with respect to the prevention messages, and so on).

In an embodiment, the method includes controlling (by the client computing device) the current handover further according to a comparison between the client status information and the further client status information of the further handover announcements. However, the current handover may be controlled in any way according to this information (for example, according to the running time and/or the criticality indicator of the most critical running software program, a weighted sum of the running times and/or the criticality indicators of any number of more running software programs, automatically or requiring a manual confirmation, and so on).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a client computing device to perform the method of above when the computer program is executed on the client computing device. An embodiment provides a computer program product that includes one or more computer readable storage media having program instructions collectively stored in said one or more computer readable storage media, the program instructions readable by a client computing device to cause the client computing device to perform the same method. However, the program may be implemented as a stand-alone module, as a plug-in for a pre-existing program (for example, a network drive) or even directly in the latter; moreover, the program may take any form suitable to be used by any client computing device (see below).

An embodiment provides a client computing device comprising means that are configured for performing the steps of the above-described method. An embodiment provides a client computing device comprising a circuitry (i.e., any hardware suitably configured, for example, by software) for performing each step of the same method. However, the client computing device may be of any type (for example, mobile/stationary, such as a smartphone, a tablet, a laptop, a desktop, any IoT device and so on).

Generally, similar considerations apply if the client computing device has a different structure or includes equivalent components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
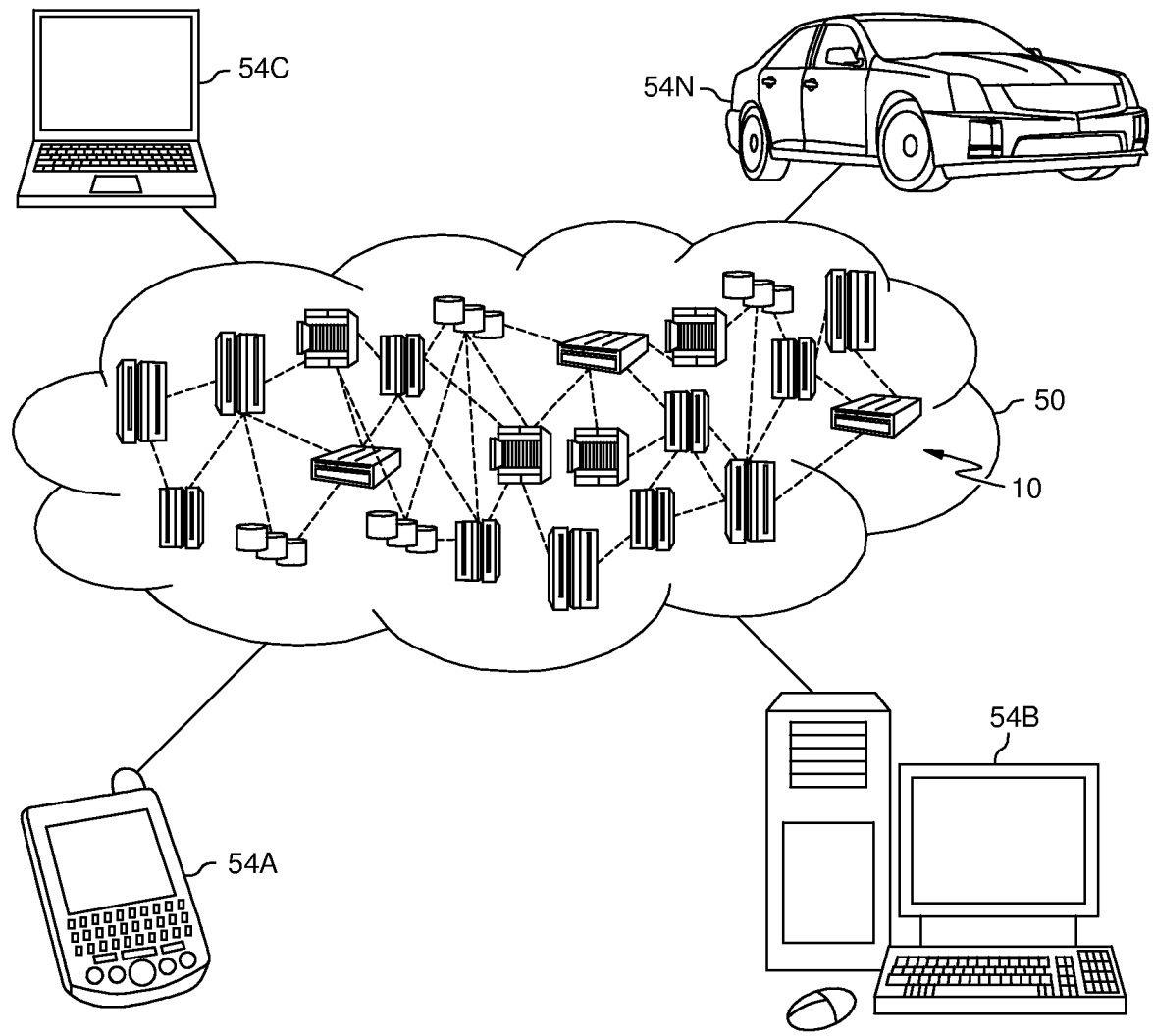
FIG. 5 is a block diagram of an illustrative cloud computing environment, according to an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
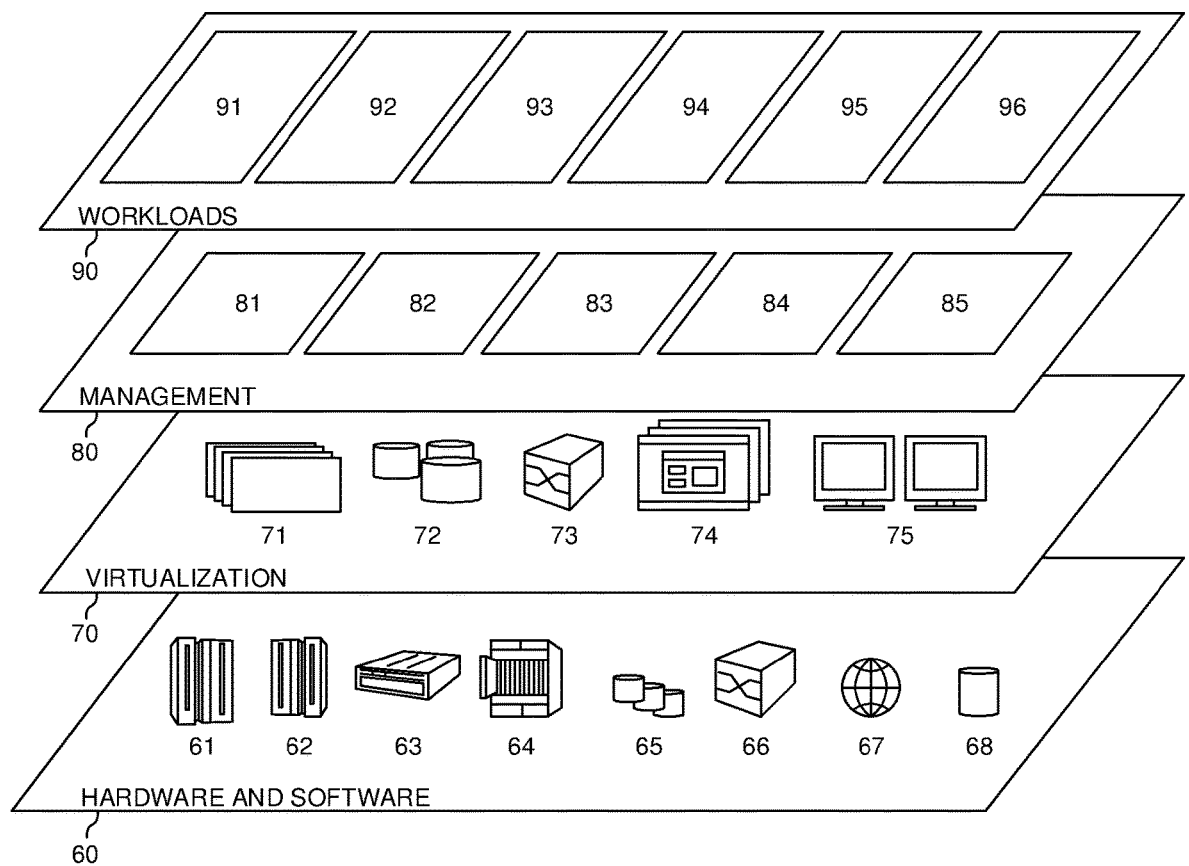
FIG. 6 is a block diagram of functional layers of the illustrative cloud computing environment of FIG. 5, according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for controlling handovers 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for controlling handovers of a client computing device among a plurality of wireless networks providing access to a service network, comprising:
   monitoring, by the client computing device, corresponding program usage information relating to the access to the service network of one or more software programs being installed on the client computing device;
   determining, by the client computing device, corresponding criticality indicators of the one or more software programs, the criticality indicator of each of the one or more software programs being determined according to the program usage information of the one or more software programs, the criticality indicators based on importance of execution of the one or more software programs and dependence of the one or more software programs on access to the service network;
   detecting, by the client computing device, one or more wireless networks from the plurality of wireless networks being available for a current handover from a current wireless network to which the client computing device is currently connected; and
   controlling, by the client computing device, the current handover from the current wireless network to a selected wireless network from the plurality of available wireless networks according to the criticality indicators of the one or more software programs currently running on the client computing device, the controlling comprising determining whether to perform the current handover based on the criticality indicators of the one or more software programs currently running indicating importance of the one or more software programs currently running and dependence of the one or more software programs currently running on access to the service network.

2. The method according to claim 1, wherein the method comprises:
   enabling, by the client computing device, the current handover according to the criticality indicators of the one or more software programs currently running on the client computing device.

3. The method according to claim 1, further comprising:
   monitoring, by the client computing device, the program usage information of the one or more software programs including at least one of corresponding usage periods, usage locations, unexpected conditions, and network workload of the software programs.

4. The method according to claim 1, further comprising:
   determining, by the client computing device, the criticality indicators of the one or more software programs further according to corresponding program types of the software programs.

5. The method according to claim 1, further comprising:
   determining, by the client computing device, at least one of a client class of the client computing device according to a client type of the client computing device, a user profile of a user of the client computing device, and program usage frequencies of the software programs; and
   determining, by the client computing device, the criticality indicators of the one or more software programs further according to the client class of the client computing device.

6. The method according to claim 1, further comprising:
   controlling, by the client computing device, the current handover further according to at least one of a current time and a current location of the client computing device.

7. The method according to claim 1, further comprising:
   determining, by the client computing device, corresponding connection types of the available wireless networks; and controlling, by the client computing device, the current handover further according to the connection types of the available wireless networks.

8. The method according to claim 1, further comprising:
determining, by the client computing device, a handover feedback of the current handover in a verification time window following the current handover;
monitoring, by the client computing device, a client operative condition of the client computing device relating to the access to the service network in the verification time window; and
determining, by the client computing device, a handover result of the current handover from the handover feedback according to the client operative condition.

9. The method according to claim 8, further comprising:
monitoring, by the client computing device, a user expression of a user of the client computing device in the verification time window; and
determining, by the client computing device, the handover feedback according to the user expression.

10. The method according to claim 8, further comprising:
monitoring, by the client computing device, corresponding program performance information relating to the usage of at least part of the running one or more software programs in the verification time window; and
determining, by the client computing device, the handover feedback according to the program performance information.

11. The method according to claim 8, further comprising:
monitoring, by the client computing device, the client operative condition of the client computing device including at least one of a network performance information of the selected wireless network, a client resource consumption of the client computing device, the running software programs and the criticality indicators of the running software programs.

12. The method according to claim 8, further comprising:
monitoring, by the client computing device, the program usage information of each of the one or more software programs comprising the handover results of any of the handovers being performed with the software program being running.

13. The method according to claim 8, further comprising:
reversing, by the client computing device, the current handover from the selected wireless network to the current wireless network in response to a negative value of the handover result.

14. The method according to claim 8, further comprising:
distributing, by the client computing device, a prevention message comprising an indication of the selected wireless network and of the criticality indicators of at least part of the running programs to one or more further client computing devices in a distribution area around the client computing device.

15. The method according to claim 14, further comprising:
receiving, by the client computing device, a further prevention message comprising an indication of the selected wireless network and of one or more further criticality indicators matching the criticality indicators of the running software programs; and
refusing, by the client computing device, the current handover in response to the further prevention message.

16. The method according to claim 1, further comprising:
distributing, by the client computing device, a handover announcement indicative of an intention to perform the current handover in a distribution area around the client computing device, the handover announcement including at least one of an indication of the selected wireless network and client status information based on the program usage information and the criticality indicators of at least part of the running software programs;
receiving, by the client computing device, corresponding further handover announcements from one or more further client computing devices, each of the further handover announcements including at least one of an indication of the selected wireless network and of further client status information based on further program usage information and further criticality indicators of at least part of further running software programs being running on the corresponding further client computing device; and
controlling, by the client computing device, the current handover further according to a comparison between the client status information and the further client status information of the further handover announcements.

17. A computer program product, the computer program product comprising one or more computer readable storage media having program instructions collectively stored in the one or more computer readable storage media, the program instructions readable by a client computing device to cause the client computing device to perform a method for controlling handovers of the client computing device among a plurality of wireless networks providing access to a service network, the program instructions comprising:
program instructions to monitor, by the client computing device, corresponding program usage information relating to the access to the service network of one or more software programs being installed on the client computing device;
program instructions to determine, by the client computing device, corresponding criticality indicators of the one or more software programs, the criticality indicator of each of the one or more software programs being determined according to the program usage information of the one or more software programs, the criticality indicators based on importance of execution of the one or more software programs and dependence of the one or more software programs on access to the service network;
program instructions to detect, by the client computing device, one or more wireless networks from the plurality of wireless networks being available for a current handover from a current wireless network to which the client computing device is currently connected; and
program instructions to control, by the client computing device, the current handover from the current wireless network to a selected wireless network from the plurality of available wireless networks according to the criticality indicators of the one or more software programs currently running on the client computing device, the controlling comprising determining whether to perform the current handover based on the criticality indicators of the one or more software programs currently running indicating importance of the one or more software programs currently running and dependence of the one or more software programs currently running on access to the service network.

18. A client computing device configured for controlling handovers of the client computing device among a plurality of wireless networks providing access to a service network, comprising:

a program monitor for monitoring corresponding program usage information relating to the access to the service network of one or more software programs being installed on the client computing device;

a program evaluator for determining corresponding criticality indicators of the one or more software programs, the criticality indicator of each of the one or more software programs being determined according to the program usage information of the one or more software programs, the criticality indicators based on importance of execution of the one or more software programs and dependence of the one or more software programs on access to the service network;

a network monitor for detecting one or more wireless networks from the plurality of wireless networks being available for a current handover from a current wireless network to which the client computing device is currently connected; and a handover controller for controlling the current handover from the current wireless network to a selected wireless network from the plurality of available wireless networks according to the criticality indicators of the one or more software programs currently running on the client computing device, the controlling comprising determining whether to perform the current handover based on the criticality indicators of the one or more software programs currently running indicating importance of the one or more software programs currently running and dependence of the one or more software programs currently running on access to the service network.

* * * * *